United States Patent [19]

Ward

[11] 4,099,182
[45] Jul. 4, 1978

[54] SIGNAL RECEIVER

[75] Inventor: Harold R. Ward, Bedford, Mass.

[73] Assignee: Raytheon Company, Lexington, Mass.

[21] Appl. No.: 760,196

[22] Filed: Jan. 17, 1977

Related U.S. Application Data

[63] Continuation of Ser. No. 549,585, Feb. 13, 1975, abandoned, which is a continuation of Ser. No. 329,239, Feb. 2, 1973, abandoned, which is a continuation of Ser. No. 148,560, Jun. 1, 1971, abandoned.

[51] Int. Cl.$^2$ ............................................. G01S 9/233
[52] U.S. Cl. ............................................. 343/17.2 PC
[58] Field of Search .................................. 343/17.2 PC

[56] References Cited

U.S. PATENT DOCUMENTS

| | | | |
|---|---|---|---|
| 3,225,349 | 12/1965 | Thor | 343/17.2 PC X |
| 3,281,842 | 10/1966 | Cerar et al. | 343/17.2 PC |
| 3,351,943 | 11/1967 | Bush et al. | 343/100 CL |
| 3,441,931 | 4/1969 | Shrader | 343/7.7 |
| 3,626,298 | 12/1971 | Anderson et al. | 343/6.5 LC |
| 3,701,154 | 10/1972 | McKinney | 343/17.2 PC X |
| 3,859,659 | 1/1975 | Heft | 343/7.7 |

OTHER PUBLICATIONS

"The Effect of Limiting or the Detectability of Partially Time-Coincident Pulse Compression Signals," by S. E. Bogoteh et al., IEEE Transactions on Military Electronics, Jan. '65, pp. 17–24.

*Primary Examiner*—Malcolm F. Hubler
*Attorney, Agent, or Firm*—Richard M. Sharkansky; Joseph D. Pannone

[57] ABSTRACT

A signal receiver employing constant false alarm rate (CFAR) circuitry is disclosed. The CFAR circuitry includes a dispersive delay line for stretching received echo signals, means for limiting the stretched echo signals and an inverse dispersive delay line for finally processing the stretched and limited echo signals. With delay lines of proper characteristics, the just-outlined processing of echo signals results in reconstituted signals, the amplitude of each one of such reconstituted signals being indicative of the source of a corresponding echo signal.

2 Claims, 7 Drawing Figures

SIGNAL RECEIVER

CROSS-REFERENCE TO RELATED CASES

This is a continuation of application Ser. No. 549,585, filed Feb. 13, 1975, now abandoned, which is a continuation of Ser. No. 329,239 filed Feb. 2, 1973, now abandoned, which is a continuation of application Ser. No. 148,560 filed June 1, 1971, now abandoned.

BACKGROUND OF THE INVENTION

This invention relates generally to signal receivers and particularly to signal receivers employing constant false alarm rate (CFAR) circuitry.

As is known in the art, receivers operated in an environment in which the level of extended background signals vary greatly may result in saturation of the receiver's detection apparatus. To avoid the deleterious effect of saturation, such receivers may be adapted to operate as a "Constant False Alarm Rate" (CFAR). In a "CFAR" receiver circuitry is provided to automatically adjust sensitivity as the level of the extended background signals vary, thereby allowing detection of larger "point" target signals regardless of the level of such background signals. The desired automatic adjustment may be accomplished by one of two techniques generally referred to as "amplitude discrimination" and "phase discrimination." As is known, satisfactory application of amplitude discrimination technique requires complex electronic control and filtering circuitry in order to achieve proper response time in the presence of widely varying levels of extended background signals. Such complex electronic circuitry, however, increases the cost of such type of CFAR circuitry. On the other hand, any phase discrimination technique used prior to the present invention is not so dependent on complex circuitry for proper operation. Such CFAR use a phase coded transmitted signal so that received echo signals, after being passed through a limiter to normalize their power prior to their being processed by the detection apparatus, are correlated with the phase coded transmitted signal. The degree of correlation then may be taken as an indication of the nature of the source of each echo signal, i.e. whether a particular echo signal is from a "point" target if an "extended" background object. Implementation of the "phase discrimination" technique requires that a portion of the CFAR circuitry is divided between the transmitter and the receiver and also that a coherent transmitter-receiver system be employed.

SUMMARY OF THE INVENTION

It is, therefore, an object of the invention to provide improved CFAR circuitry for a signal receiver, such circuitry being adapted to "phase discriminate" between echo signals from "point" and "extended" targets without requiring either coherent or phase coded transmitted signals.

It is another object of the invention to provide comparatively inexpensive CFAR circuitry, such circuitry being comparable in performance to relatively costly CFAR circuitry.

These and other objects of the invention are attained generally by providing, for the signal receiver in a pulsed ranging system, CFAR circuitry wherein all received echo signals are passed through a limiter to limit the power of such limited echo signals to a predetermined level prior to such signals being further processed by the receiver's detection apparatus. Such power limiting of the echo signals thereby normalizes the sensitivity of the signal receiver and prevents saturation of such detection apparatus. The CFAR circuitry also includes means for encoding the received echo signals prior to their being processed by the limiter and means, fed by the limiter, for decoding the power limited signals in a manner such that the background echo signals can be distinguished from "point" target echo signals. In a preferred embodiment the encoding means is a first dispersive delay line for distributing the power in the received echo signals from their original time duration, $\delta$, to a longer time duration $T$. The decoded means is a second dispersive delay line, with characteristics substantially inverse to the first dispersive delay line, for converting the distributed and limited signals back into their respective original shorter time duration.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENT

Figure 1:
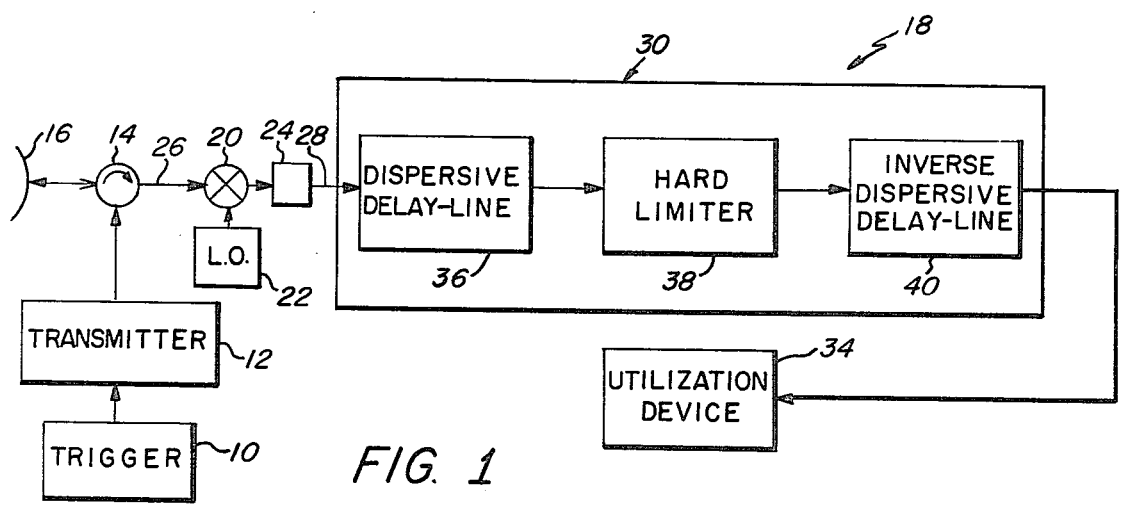
FIG. 1 shows a search radar employing the principles of the invention.

Referring now to FIG. 1, it should first be noted that, for convenience, a search radar has been selected to illustrate how this invention may be applied. Thus, the illustrated radar included a system trigger generator 10, a transmitter 12, a circulator 14 and an antenna 16, all of conventional design and arrangement whereby pulses of RF energy are transmitted and echo signals from reflections of such energy by scattering surfaces (not shown) are received. Here echo signals are the result of RF energy reflections from extended background objects (such as clutter) and relatively larger "point" targets. The echo signals are processed by a CFAR receiver 18. Such CFAR receiver 18 includes a mixer 20, local oscillator 22 and filter 24 arranged in a conventional manner to convert received RF echo signals (appearing on line 26) to IF echo signals (on line 28). It is noted that local oscillator 22 need not be coherent with transmitter 12. The IF echo signals are processed by CFAR circuitry 30 and conventional detector and display apparatus, here utilization device 34.

Figure 2A:
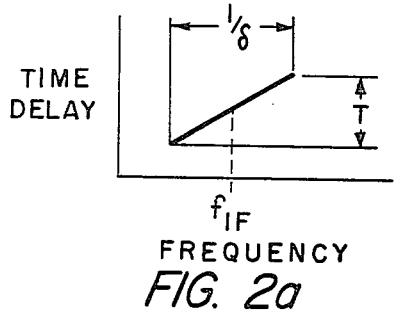
FIGS. 2a–b show the time delay vs. frequency characteristic of delay lines employed by the radar of FIG. 1.
Figure 2B:
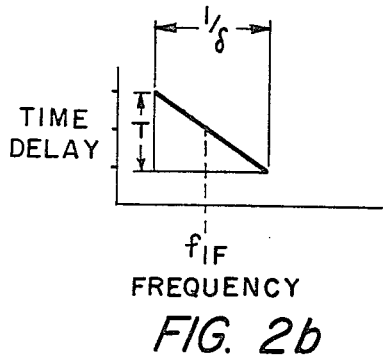

CFAR circuitry 30 is made up of an encoder, here dispersive delay line 36, a hard limiter 38, and a decoder, here inverse dispersive delay line 40. Dispersive delay line 36 and inverse dispersive delay line 40 are preferably of any conventional design, such as those described in *Radar Handbook* by M. I. Skolnik, McGraw-Hill Book Company, N.Y., 1970, pg. 20-8 to pg. 20-13. That is, delay lines 36, 40 each preferably has a linear time delay against frequency change characteristic as shown in FIGS. 2a and 2b, respectively. It is not essential that such devices have linear characteristics. It is, however, essential, for reasons to become apparent, that the time delay against frequency change characteristics for the dispersive delay line 38 and inverse dispersive delay line 40 are substantially inverse one from the other. Hard limiter 38 may be of any conventional design, such as those described in *Radar Handbook* by M. I. Skolnik, McGraw-Hill Book Company, N.Y., 1970, pgs. 5-36 to 5-38. One requirement of limiter 38 is that is have the characteristic of limiting the power of all signals at its output a predetermined maximum level, the magnitude of such maximum level being such that utilization device 34 will not be saturated by such limited signals. A second requirement of limiter 38, for reasons to become apparent, is that it have insignificant effect on the phase of signals passing therethrough.

Figure 3A:
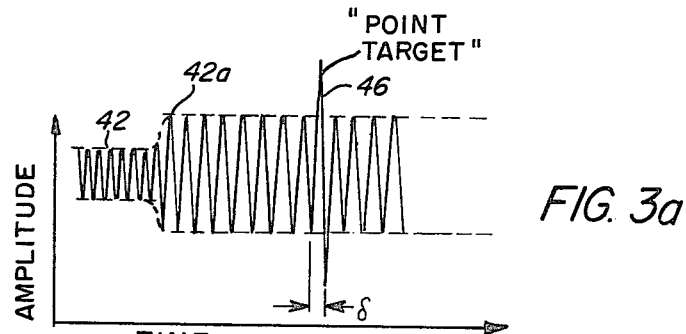
FIGS. 3a–d show time histories of signals generated in the radar of FIG. 1.
Figure 3B:
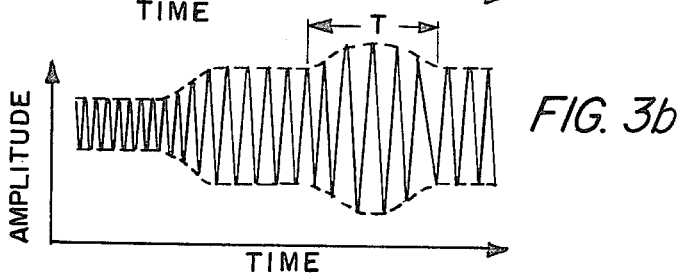
Figure 3C:
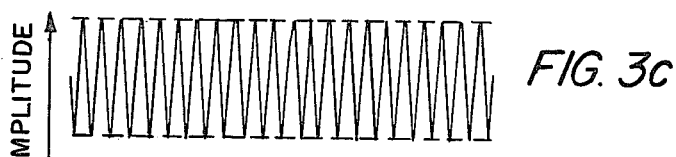
Figure 3D:
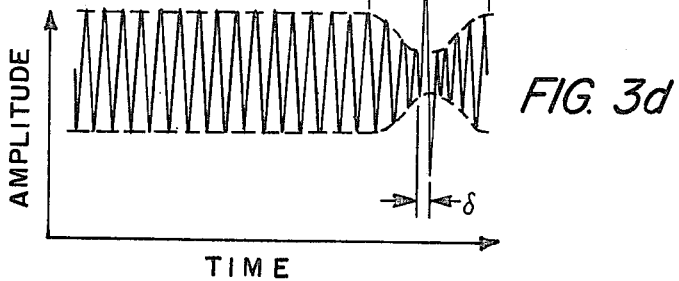

The operation of CFAR circuitry will now be discussed with additional reference also to FIGS. 3a-3d. A portion of a typical IF echo signal which may appear on line 28 as a result of a transmitted pulse of time duration $\delta$ is shown in FIG. 3a. Such signal is shown to have a portion 42 (attributable to relatively low level background objects), a portion 42a (attributable to relatively high level background objects), and a portion 46 (attributable to a larger "point" target). It is noted that the presence of a "point" target can be ascertained when its amplitude is larger than that of the background objects and its time duration is significantly smaller than the time duration of the background objects. FIG. 3c shows the signal at the output of hard limiter 38. It is noted that detection of a "point" target by observation of the amplitude of the limited signal is impossible because such limited signal has a substantially constant amplitude level. It is obvious, however, that because of such constant amplitude level the sensitivity of the received can be said to be "normalized," thereby meeting the requirement of CFAR circuitry. The function of dispersive delay line 36 and inverse dispersive delay line 40 is to encode the echo return signals and decode such echo return signals respectively in a manner such that information of the presence of both background echoes and "point" target echoes remains contained in the limited signal while enabling discrimination between such echoes by observation of the amplitude of the signals appearing at the output of the inverse dispersive delay line 40. Such functions are possible by converting the amplitude characteristics associated with "point" target echoes and background object echoes into a corresponding phase of frequency characteristic. The latter characteristic cannot therefore be destroyed by hard limiter 38 because such limiter is required to have (as stated) insignificant effect on the phase of signals passing through it.

Because dispersive delay line 36 has a time delay vs. frequency characteristic substantially shown in FIG. 2a, the power of the signal on line 28 becomes dispersed over a longer time duration, here T. This effect can be seen in FIG. 3b where it may be observed that the portion of the signal attributable to the "point" target 46 (FIG. 3a) has been dispersed from an interval $\delta$ to an interval, substantially, T.

One possible way of understanding the function of dispersive delay line 36 and inverse dispersive delay line 40 is to recognize that background echo signals are the result of reflections of the transmitted RF pulse from a series of individual reflectors. Therefore, such echo returns can be viewed as being made up of a series of individual echo signals, each one of such individual echo signals having a time duration $\delta$ and random phase. However, the energy contained within any one of such time duration is larger if attributable to the "point" target echo signal than if attributable to any one of the individual reflector echo signals. Dispersive delay line 36 distributes the energy in each one of the individual echo signals (regardless of whether such echo signal is from the "point" target or any one of the individual reflectors) from the time duration $\delta$ to a longer time duration, here T. Let it be further assumed that the energy from the "point" target has been distributed so as to appear at a time interval between $t_1$ and $t_2$ (where $t_2 - t_1 = T$) and that a selected one of the individual background echo signals is distributed between a time interval $t_3$ and $t_4$ (where $t_4 - t_3 = T$). Therefore, in addition to the entire energy of the echo signal from the "point" target and the entire energy of the echo signal from the selected background echo signal being contained in the time intervals between "$t_1$ and $t_2$" and "$t_3$ and $t_4$," respectively, portions of energy from echoes from individual background reflections adjacent to the "point" target and the selected background echo signal are also contained within both such time intervals. As all energy distributed signals pass through hard limiter 38 the signals at the output of such limiter have a constant amplitude and an unaltered phase structure with respect to the input signals thereto. However, the distributed energy associated with the "point" target echo signal will remain greater than the distributed energy associated with any one of the individual background echo signals. The limited signals are then passed through inverse dispersive delay line 40. Distributed energy from each "point" target echo signal is compressed back into a time duration $\delta$ (because such echo signal has a properly structured phase characteristic); however, the portions of energy from adjacent background echoes which are also contained in the same time interval are not so compressed (because each such portion has a randomly structured phase characteristic not proper for compression by inverse dispersive delay line 40.)

A little thought will make it apparent that if each one of the individual background echo signals are now considered it will become evident that the level of the signal at the output of inverse dispersive delay line 40 attributable to the background echoes will be smaller than the level of the signal attributable to the "point" target echo. In fact, if the time duration of the background echo signals is longer than the time duration T, the energy in such background echo signals in the time duration T will, after compression, remain distributed in the time duration T. Therefore, if the level of the compressed background echo signals is $P_B$ watts the level of the compressed "point" target signal ($P_t$ watts) will be:

$$P_t = (T/\delta) P_B$$

Likewise, if the "point" target is actually comprised of "$n$" points, the level of the compressed "point" target signal, $P_t$, will be reduced in level by a factor of "$n$" and for the duration of such signal will be extended in time by a factor of "$n$".

While the invention has been described for use in a radar system receiver, as will now be obvious to one of ordinary skill in the art, the invention can be implemented for use in other signal receivers. For example, the invention can be used in signal receivers used in sonar systems or depth finding systems. It is felt, therefore, that this invention should not be restricted to the proposed embodiments, but rather should be limited only by the spirit and scope of the following claims.

What is claimed is:

1. In a signal receiver for processing echo signals produced by reflections of a pulse of energy from a "point" target and from various extended background objects, the amplitude of the echo signals varying between adjacent ones of such background objects, the "point" target echo signal being characterized by an amplitude greater than the amplitude of adjacent background echo signals and a time duration smaller than the time duration of adjacent background echo signals, the combination comprising:
   (a) a dispersive delay line, responsive to all echo signals, for dispersing the power in each one of the echo signals from its original time duration to a second longer time duration;
   (b) hard limiter means, fed by the dispersed echo signals out of the dispersive delay line, for limiting the level of all the dispersed echo signals to normalize the gain of the receiver at a predetermined level; and
   (c) an inverse dispersive delay line, fed by the limited and dispersed echo signals out of the limiter means, such inverse dispersive delay line having a time delay-frequency characteristic substantially inverse to the time delay-frequency characteristic of the dispersive delay line, each delay line having the same time-bandwidth product, for reconstituting the dispersed and limited echo signals from the second longer time duration to the original time duration.

2. In a signal receiver for detecting, with a constant false alarm rate, target echo signals in the presence of clutter echo signals of varying amplitude, the frequency spectrum of the target echo signals differing from the frequency spectrum of the clutter echo signals, the improvement comprising:
   (a) a dispersive delay line, responsive to all target echo signals and clutter echo signals, for stretching each one of such signals in accordance with its frequency spectrum;
   (b) hard limiter means, responsive to each stretched one of the target echo signals and to each one of the stretched clutter echo signals for limiting each stretched one of the target echo signals and each one of the stretched clutter echo signals to normalize the gain of the receiver at a predetermined level and to enable the receiver to operate at a constant false alarm rate; and
   (c) an inverse dispersive delay line, responsive to the equalized signals out of the limiter means, for restoring each one of such signals to its original length, the amplitude of clutter echo signals coincident with target echo signals thereby being less than the amplitude of all other clutter echo signals, the time-bandwidth product of the dispersive delay line being equal to the time-bandwidth product of the inverse dispersive delay line.

* * * * *